(12) United States Patent
Khurana et al.

(10) Patent No.: US 11,057,660 B1
(45) Date of Patent: *Jul. 6, 2021

(54) COMPUTING PEAK SEGMENT BIT RATE FOR VARIOUS CONTENT STREAMING SCENARIOS

(71) Applicant: Amazon Technologies, Inc., Seattle, WA (US)

(72) Inventors: Avinash Priya Khurana, Beaverton, OR (US); Timothy Prins, Hillsboro, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,793

(22) Filed: May 8, 2020

Related U.S. Application Data

(63) Continuation of application No. 16/044,274, filed on Jul. 24, 2018, now Pat. No. 10,694,238.

(51) Int. Cl.
| | |
|---|---|
| *H04N 7/025* | (2006.01) |
| *H04N 21/262* | (2011.01) |
| *H04N 21/2343* | (2011.01) |
| *H04N 21/235* | (2011.01) |
| *H04N 21/234* | (2011.01) |

(52) U.S. Cl.
CPC ... *H04N 21/26258* (2013.01); *H04N 21/2358* (2013.01); *H04N 21/23424* (2013.01); *H04N 21/23439* (2013.01)

(58) Field of Classification Search
CPC ......... H04N 21/6125; H04N 21/23439; H04N 21/2187

USPC ............................................ 725/34
See application file for complete search history.

(56) References Cited

U.S. PATENT DOCUMENTS

| | | |
|---|---|---|
| 10,033,777 B2 | 7/2018 | Lotfallah et al. |
| 2017/0331872 A1 | 11/2017 | Levy |
| 2017/0359628 A1 | 12/2017 | Sachdev et al. |
| 2018/0338168 A1 | 11/2018 | du Breuil |

OTHER PUBLICATIONS

Apple Inc., "HLS Authoring Specification for Apple Devices," Article, downloaded Jul. 24, 2018, 17 pages.
Pantos, et al., "HTTP Live Streaming: draft-pantos-http-live-streaming-23," Internet Draft, Apple Inc, May 22, 2017, 58 pages.
Pantos, et al., "HTTP Live Streaming," Independent Submission, Apple Inc., Aug. 2017, 60 pages.
U.S. Appl. No. 16/044,274, filed Jul. 24, 2018, Khurana et al.
U.S. Office Action dated Aug. 12, 2019 issued in U.S. Appl. No. 16/044,274.
U.S. Final Office Action dated Jan. 2, 2020 issued in U.S. Appl. No. 16/044,274.
U.S. Notice of Allowance dated Mar. 3, 2020 issued in U.S. Appl. No. 16/044,274.

*Primary Examiner* — Jivka A Robovianski
(74) *Attorney, Agent, or Firm* — Weaver Austin Villeneuve & Sampson LLP

(57) ABSTRACT

Methods and apparatus are described for estimating the peak bit rate for content and specifying the BANDWIDTH tag value for HLS content. This disclosure also describes techniques by which live content and VOD content can be stitched together in a way that harmonizes the different requirements for the BANDWIDTH tag for the different types of content.

15 Claims, 3 Drawing Sheets

COMPUTING PEAK SEGMENT BIT RATE FOR VARIOUS CONTENT STREAMING SCENARIOS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Media content is delivered to client devices over networks using a variety of content streaming protocols including HTTP Live Streaming (HLS) implemented by Apple Inc. of Cupertino, Calif. Segments of media content for different versions or "variant streams" of the same content encoded at different bit rates are specified in a playlist. A content service provides the playlist to a media player on a client device which uses the playlist to generate properly formatted requests for segments of the media content for playback on the client device.

The HLS protocol may be used by a media player to play back content in different streaming scenarios referred to as "live" streaming and "video on demand" or "VOD" streaming VOD streaming involves content for which all of the media segments have already been encoded such as, for example, television shows or feature-length films that are available "on demand" from a video service provider's library of content. Live streaming involves content (sometimes referred to as "linear content") for which the media segments are encoded substantially in real time such as, for example, live sporting events, broadcast news, or content channels with scheduled content.

An HLS playlist includes tags for each variant stream that specify characteristics of the corresponding stream for use by the media player in controlling the manner in which it requests content segments. One required tag is the BANDWIDTH tag, the value for which represents the peak segment bit rate of the corresponding variant stream. Once this tag value is set, it remains fixed in the playlist for the duration of the streaming session.

Because all of the content segments for VOD content are previously generated, the actual peak bit rate and therefore the value for the BANDWIDTH tag may be determined with a high degree of accuracy before streaming of the VOD content begins. By contrast, because the content segments for live content are encoded in real time, the value of the BANDWIDTH tag is not determined in the same way. Inappropriate selection of the tag value can have negative consequences. If the tag value is too high, the media player may operate too conservatively, increasing the time required to begin playback of the content and/or potentially reducing the visual quality of the content played back on the client device. On the other hand, if the tag value is too low, the operation of the media player may not properly anticipate the peak bit rate, potentially resulting in an increase in rebuffering events.

Moreover, different constraints are imposed for the BANDWIDTH tag value for live content vs. VOD content. For streaming scenarios in which content from multiple sources is stitched together into a single streaming session, these differing requirements create the potential for circumstances to arise in which inserted secondary content (e.g., advertising content) has a peak bit rate that doesn't conform to the limit originally communicated to the media player at the beginning of the session.

DETAILED DESCRIPTION

This disclosure describes techniques for estimating the peak segment bit rate for live and VOD content and specifying the value of bandwidth tags for each (e.g., the BANDWIDTH tag value for HLS content). This disclosure also describes techniques by which live content and VOD content can be stitched together in a way that harmonizes the different requirements for the bandwidth tag for the different types of content. An example will be instructive.

Figure 1:
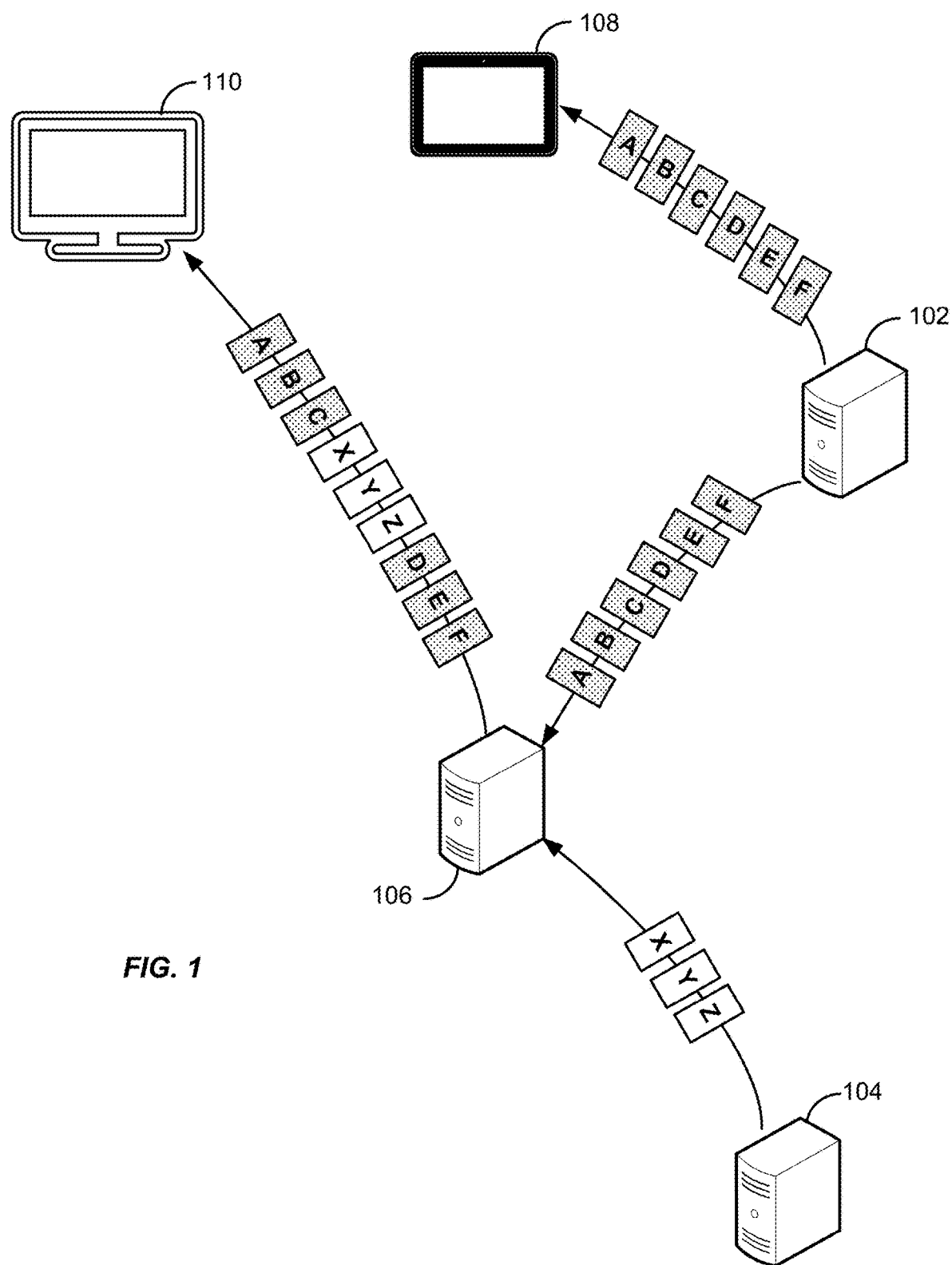
FIG. 1 illustrates an example in which bit rate constraints for live and video-on-demand content are harmonized.

FIG. 1 depicts various video streaming services that collectively provide streaming video to a population of client devices over the Internet. The video streaming services include a primary video service 102, an advertising video service 104, and a video stitching service 106. Client device 108 is depicted as conducting a video streaming session with primary video service 102. Client device 110 is depicted as conducting a video streaming session via video stitching service 106 that includes video content from primary video service 102 and ad video service 104. This scenario might occur, for example, where client device 108 is accessing a paid premium video service without ads, while client device 110 is consuming the same content for free but with ads inserted.

It should be noted that the computing environment of FIG. 1 and the relationships among these various services and clients have been simplified in the figure for clarity. For example, in an actual implementation, the content fragments themselves would not be transmitted in the manner depicted but would instead be delivered via a content distribution network (CDN) in accordance with manifest data (e.g., HLS playlists) provided to the client devices. The scope of the present disclosure should therefore not be limited by reference to the depicted example.

In the depicted example, the content from primary video service 102 (i.e., primary content fragments A through F) is live content encoded in real time (e.g., using the H.264 codec) and delivered via the HLS content streaming protocol. By contrast, the content from ad video service 104 (i.e., ad content fragments X, Y, and Z), while encoded using the same codec as the live content, is previously encoded as VOD content and packaged for delivery using the HLS protocol.

The HLS Authoring Specification for Apple Devices (the entirety of which is incorporated herein by reference for all purposes) requires that, for VOD content, the actual peak bit rate for a given variant stream must be within 10% of the BANDWIDTH tag value specified for that stream. By contrast, for live content, the actual peak bit rate for a given variant must be less than 125% of the BANDWIDTH tag value. Because the live content from service 102 and the VOD content from service 104 are independently encoded and packaged, regardless of how their respective actual peak bit rates are determined or estimated, the specified value for the BANDWIDTH tag associated with each reflects these different constraints. Thus, there is potential for the ad content stitched with the live content by stitching service 106 to have a peak bit rate that does not conform to the limit set by the BANDWIDTH tag value of the live content.

For example, a content stitching service might stitch content from two different sources together by associating variant streams from the two different sources based on a common target bit rate. However, using such an approach for situations like the one depicted in FIG. 1, there is no guarantee that the peak bit rate for the inserted VOD content will conform to the constraint set by the BANDWIDTH tag for the live content. This may be a problem in that the media player of a client consuming the stitched stream may be operating based on the HLS tags associated with the primary content, i.e., the live content stream.

Therefore, according to a particular class of implementations, video stitching service 106 includes logic that associates the variant streams of the ad content with those of the primary content based on a determination as to whether the BANDWIDTH tag associated with a given variant of the ad content corresponds to an allowable peak bit rate that conforms to the BANDWIDTH tag associated with a corresponding variant of the live content. Only if this condition is met will the combination be allowed as a variant of the stitched content delivered to clients.

Assuming the condition is met, video stitching service 106 generates a playlist for the stitched content stream that includes references to content fragments from both services 102 and 104 for each of its variant streams. The value of the BANDWIDTH tag for the combined playlist is the same as the value for the primary content; the peak bit rate for the inserted ad content having been determined to conform to that constraint. In this way, the different constraints for the HLS BANDWIDTH tag for live and VOD content may be harmonized.

Figure 2:
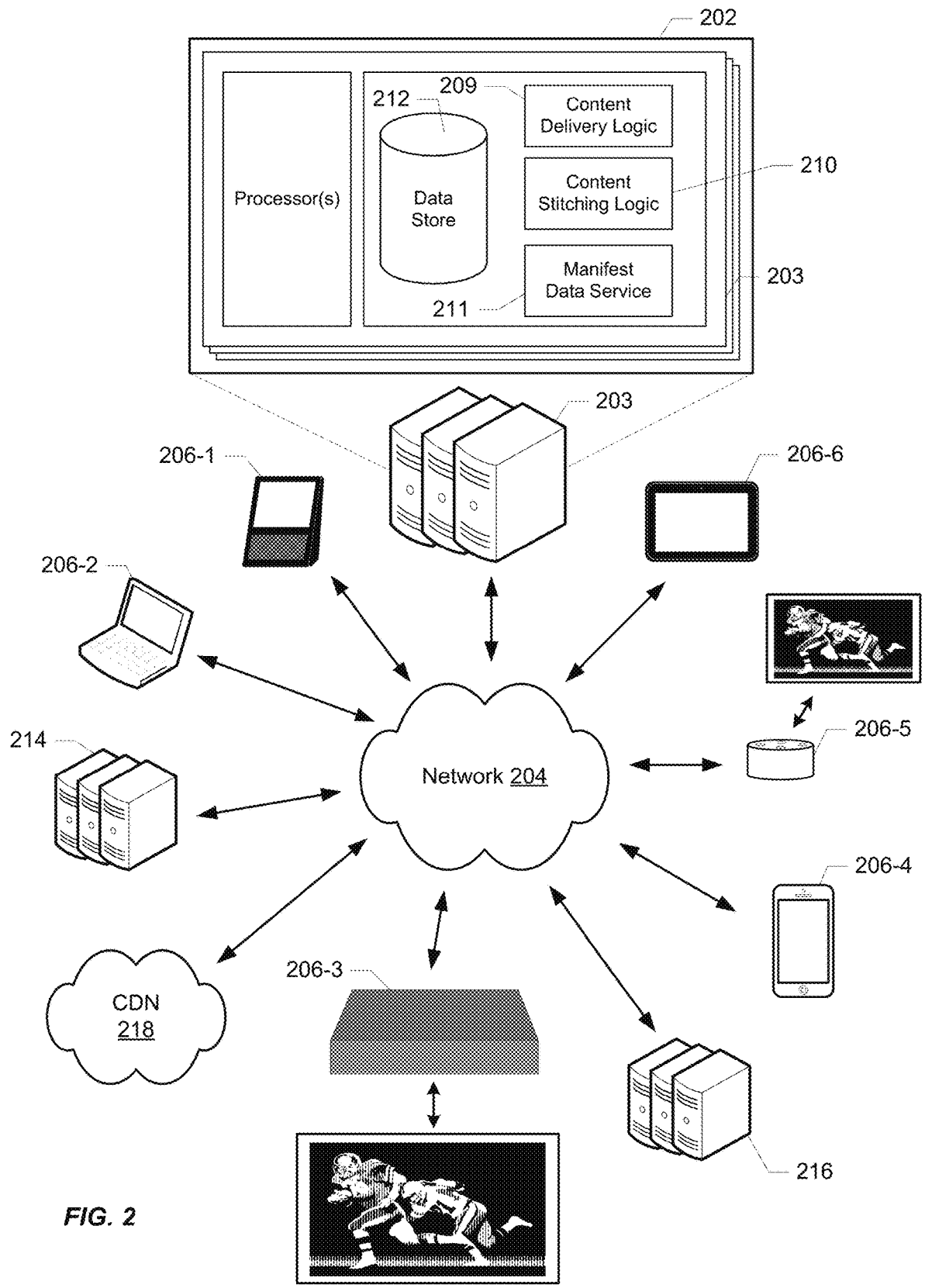
FIG. 2 illustrates a computing environment in which particular implementations enabled by the present disclosure operate.

FIG. 2 illustrates an example of a computing environment in which a content service 202 provides streaming content (e.g., video and/or audio) via network 204 to a variety of client devices (206-1 through 206-6) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming streaming content provided by service 202. Such devices may include, for example, mobile devices (e.g., cell phones, smart phones, and tablets), personal computers (e.g., laptops and desktops), set top boxes (e.g., for cable, satellite, and streaming systems), smart televisions, digital assistant devices, gaming consoles, wearable computing devices, etc.

Content may be delivered by content service 202 using a variety of video codecs and streaming formats. For example, implementations are described herein with reference to the MPEG-4 Part 10, Advanced Video Coding standard (AVC or H.264). Implementations are also contemplated in which other video codecs are employed to encode or transcode live and VOD content such as, for example, the High Efficiency Video Coding standard (HEVC or H.265), H.266, AV1, VP8, and VP9.

At least some of the examples described herein contemplate implementations based on computing models that enable ubiquitous, convenient, on-demand network access to a shared pool of computing resources (e.g., networks, servers, storage, applications, and services) to provision origin stacks and provide streaming content. As will be understood, such computing resources may be integrated with and/or under the control of the same entity, e.g., the entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In accordance with the techniques described herein, content service 202 provides access to live content (e.g., primary content originating from live content source 214) and VOD content (e.g., advertising content originating from VOD content source 216) using multiple, redundant origin stacks (not shown for clarity) in conjunction with one or more content delivery networks (e.g., CDN 218) that may or may not be independent of content service 202. As will be appreciated, content service 202 may be integrated to varying degrees with the platforms and/or networks in which the live content source, the VOD content source, the origin stack resources, and/or CDNs operate. For example, one or more origin stacks may be integrated with or in the same co-location facility or data center as content service 202. In another example, content source 214 and/or content source 216 may share facilities with or may be in facilities that are remote from that in which content service 202 operates. In another example, an origin stack may be in the same network or facility as a CDN that is streaming its content. The range of variations known to those of skill in the art are contemplated to be within the scope of this disclosure.

Content service 202 includes logic that facilitates at least some aspects of the delivery of streaming content to client (e.g., as represented by content delivery logic 209). Content service 202 also includes logic that facilitates the stitching of content from different sources (e.g., content stitching logic 210). Content stitching logic 210 may be part of or work in conjunction with a service 211 that provides manifest data (e.g., HLS playlists) to client devices. Such a manifest data service might be configured to provide manifest data for both primary content alone and stitched content (e.g., primary content with inserted secondary content as described herein).

In addition, content service 202 may include a variety of information related to the streaming content (e.g., the content itself, associated metadata, playlists, manifest data, etc.)

in data store 212 to which service 202 provides access. Alternatively, such information about the streaming content, as well as the streaming content itself may be provided and/or hosted by one or more separate platforms, e.g., CDN 218. It should be noted that, while content stitching logic 210, manifest data service 211, and data store 212 are shown as integrated with content service 202, implementations are contemplated in which either or both operate remotely from the associated content service. From these examples, those of skill in the art will understand the diversity of use cases to which the techniques described herein are applicable.

Figure 3:
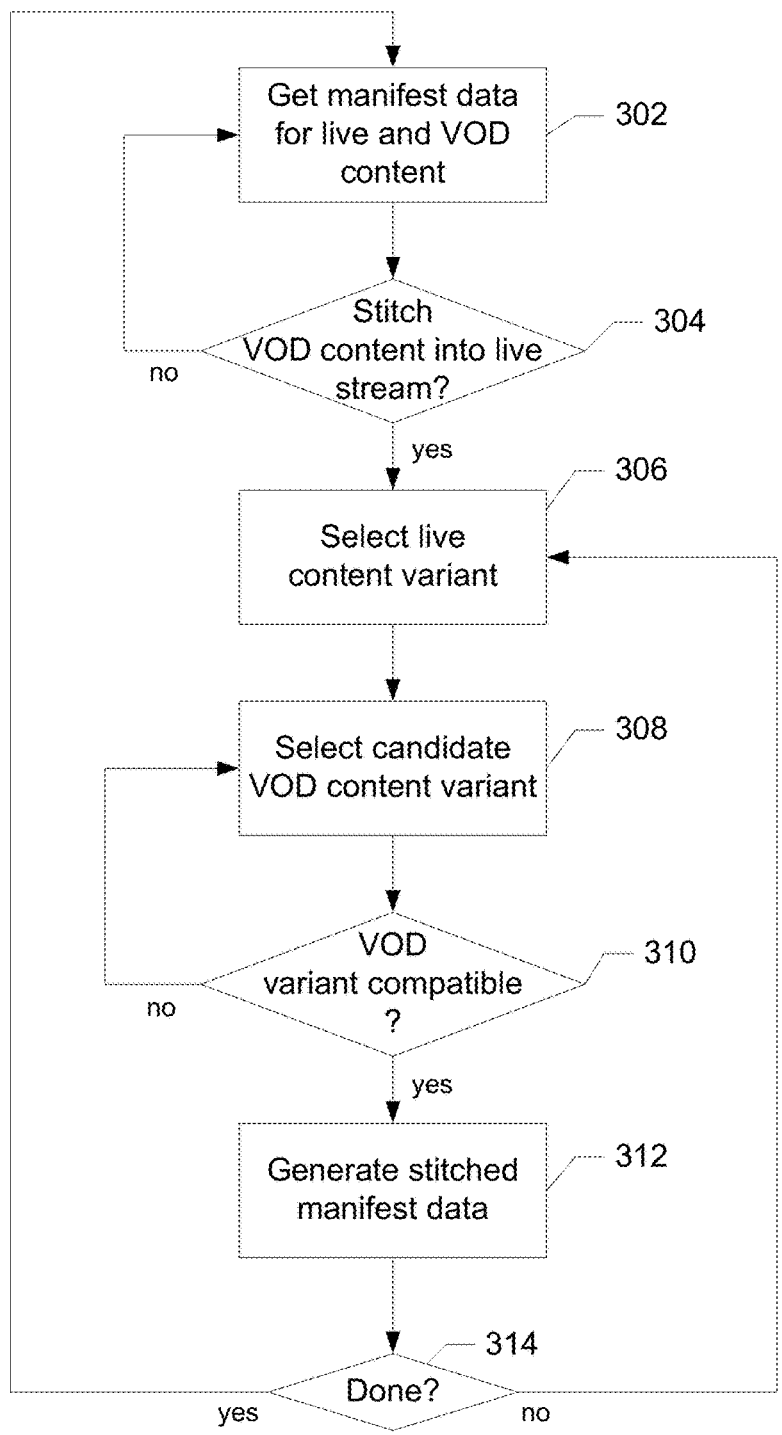
FIG. 3 is a flowchart illustrating operation of a particular implementation.

Operation of a specific implementation will now be described with reference to the flow diagram of FIG. 3. A content service (e.g., content service 202) generates or receives manifest data (e.g., HLS playlists) for live content (e.g., from live content source 214) and VOD content (e.g., from VOD content source 216) (302). For a given live content presentation, e.g., a sporting event, the live manifest data include a set of metadata tags for each variant stream of the live presentation. These tags include a bandwidth tag for each variant that represents the peak bit rate for that live variant. Similarly, for each presentation of VOD content (e.g., a particular advertisement), the VOD manifest data include a bandwidth tag for each variant that represents the peak bit rate for that VOD variant.

As discussed above, different constraints are placed on the values for such tags for HLS content (referred to herein in all caps as BANDWIDTH) depending on whether the content is live content or VOD content. More specifically, the HLS Authoring Specification for Apple Devices (the HLS Authoring Spec) requires that, for VOD content, the actual peak bit rate of the variant with which the tag is associated must be within 10% of the BANDWIDTH tag value. By contrast, for live content, the actual peak bit rate of the variant must be less than 125% of the BANDWIDTH tag value.

For some client devices consuming live content from the content service, client manifests (e.g., in the form of HLS playlists) that are derived solely from the live manifest data may be provided to the client devices for streaming the live presentation without the insertion of secondary content. As mentioned above, this might be done as part of a premium service that does not include advertising content.

For other client devices, the same live presentation is provided with inserted secondary content (e.g., VOD ad content). This is accomplished using stitched client manifests that are generated (e.g., using content stitching logic 210) based on the live manifest for the live presentation and the VOD manifests for the inserted secondary content. Referring again to FIG. 3, when it is determined that a particular presentation of secondary VOD content (e.g., a specific ad) should be stitched into the live stream (304), for each variant of the live content (306), the content stitching logic selects a candidate variant of the VOD content for stitching with the live variant (308). This might be done, for example, based on matching or getting close to matching one or more of the characteristics of the variant of the VOD content to that of the live variant; characteristics such as, for example, format (e.g., HLS), aspect ratio, resolution, target bit rate, etc.

For HLS content, the BANDWIDTH tag value for the live stream is the only value of that tag that the media player on the client device receives as it consumes a single stream that includes both the primary content and the inserted content. The media player operates based on that value without reference to the fact that VOD content (e.g., in the form of ads) may be inserted in the stream. If the peak bit rate of one of those ads violates the limit represented by the BANDWIDTH tag value of the live content, rebuffering might occur.

To avoid or reduce the likelihood of such an occurrence, a determination is made as to whether the candidate VOD variant is compatible with the live variant (310). This may be done, for example, by determining whether the bandwidth tag associated with the candidate VOD variant conforms to the peak bit rate constraint represented by the bandwidth tag of the live variant into which the secondary content is being inserted. According to a particular implementation in which the live content and the VOD content are both HLS content, this determination is made to ensure that the peak bit rate allowed by the value of BANDWIDTH for the VOD variant is less than or equal to the peak bit rate allowed by the value of BANDWIDTH for the variant of the live content, i.e., that $BANDWIDTH_{VOD} \times 1.1 \leq BANDWIDTH_{Live} \times 1.25$.

As will be appreciated, the determination as to whether a VOD variant is compatible with a live variant may be accomplished using a variety of comparisons and calculations without departing from the scope of the present disclosure. For example, instead of determining whether the relation specified above holds, it could instead be determined whether the tag values are close enough to each other as a percentage of one value or the other, e.g., whether the value for the live bandwidth tag at least 88% of the value for the VOD bandwidth tag, or whether the value for the VOD bandwidth tag is no more than about 13% greater than the live bandwidth tag. Other variations on this theme will be apparent to those of skill in the art.

If the compatibility condition is not met, a different VOD variant of the secondary content is selected (308). This might be, for example, the VOD variant with the next lower bit rate. On the other hand, if the condition is met, the insertion is allowed to proceed by inclusion of the VOD manifest data for the selected VOD variant with the live manifest data for the live variant as part of a single variant stream in the stitched client manifest (312). The process repeats for each variant of the live stream (314), and then continues as further live manifest data become available and new VOD content is selected for insertion.

For HLS content, the BANDWIDTH tag is in the HLS Master Playlist and is present for each variant that includes multiple renditions (e.g., an audio rendition and a video rendition). The value of BANDWIDTH places a constraint on the actual data in the stream whether the content is VOD or live. For VOD content, all of the content fragments have been encoded and so an accurate value for BANDWIDTH may be determined. For example, the peak bit rate can be empirically determined from the encoded content and the value of BANDWIDTH set accordingly.

However, for live streaming, because the Master Playlist is made available before all of the content data have been encoded, the value for BANDWIDTH cannot be based on the actual content. According to a class of implementations, the value for BANDWIDTH for live content is based on an estimate of the peak bit rate as determined using an equation that is based on the encoder settings for a given variant. According to a particular implementation in which the video data are encoded using the H.264 codec, the equation is based on the average or target bit rate for the encoder and the size of the variable bitrate buffer (vbb) used by the encoder, and is given by:

$$\text{BANDWIDTH} = (\text{peakAudioBitrate} + (0.9 * \text{hrdBufferSize} + \text{segmentLengthSeconds} * \text{videoBitrate}) / \text{segmentLengthSeconds}) / 1.25 \quad (1)$$

in which peakAudioBitrate is the peak audio bit rate in bits/second, hrdBuffersize is the size of the HRD buffer in bits, segmentLengthSeconds is the size of each chunk of video as defined by the user, and videoBitrate is the average video bit rate in bits/second. As will be appreciated by those of skill in the art, for implementations involving other codecs, the corresponding parameters for those codecs would be substituted for these parameters in equation (1).

As can be seen, equation (1) accounts for contributions to the bit rate from the audio rendition for that variant. This term may be ignored in some implementations or replaced with the average audio bit rate. In any case, examples of implementations discussed herein focus on the video contribution for the sake of clarity. Equation (1) assumes a worst case of the vbb buffer being 90% full. This assumption results in a peak bit rate of 1.9× the average or target bit rate for that variant. So, for example, for a target bit rate of 10 Mb/s, this gives a peak bit rate of about 19 Mb/s.

As mentioned above, the value for BANDWIDTH should not be set too conservatively (i.e., too high) to avoid negatively impacting the delivery of high quality fragments due to the client media player's download heuristic behaving more conservatively; slowing down its ramp up and/or resulting in playback of lower quality video than the network conditions would otherwise allow. So it is preferable to set BANDWIDTH lower than the expected peak. On the other hand, the value for BANDWIDTH should not be set so low that the rebuffering rate at the player increases to an unacceptable level. The limit set by the HLS authoring spec may be used to strike a balance between the ramp up time for the player and the true peak bit rate. So, for example, for the average bit rate of 10 Mb/s, the value for BANDWIDTH for live content can be set at 19/1.25 Mb/s, or about 15 Mb/s. Once set, the value for BANDWIDTH for live content is fixed for the entire live streaming session.

In contrast to live content, advertising content is typically encoded offline using VOD encodings. So all of the fragments of each HLS variant are available ahead of time for determining what the value of the BANDWIDTH tag should be. As mentioned above, this allows for setting the value for BANDWIDTH based on the actual peak bit rate of the encoded content. Alternatively, the value for BANDWIDTH for VOD content may be set based on an equation such as equation (1). Regardless of how the tag value for each type of content is set, it is desirable to take measures to ensure that, when inserting ad content into a live stream, the value of the bandwidth tag specified for the ad content does not violate the constraint defined by the value of the tag specified for the live stream. The content stitching logic described above is one way of achieving this goal. However, as will be appreciated, such an approach does not guarantee that there will be a suitable VOD variant for each and every variant of the live content.

According to an alternate approach in which influence or control over one or both of the live and VOD encoder settings is assumed, the configuration files for the encoders (or transcoders) of the live content and the VOD content are configured to ensure matching target bit rate ladders for the two different types of content. That is, the bit rate ladders are configured such that, for each and every live content variant there is a corresponding VOD content variant with the same target bit rate. Using an equation in which the peak bit rate for both types of content is estimated based on the specified target bit rate (e.g., equation (1)), live and VOD content encoded with the same target bit rate would also have the same estimated peak bit rate if the size of the encoder buffers were also the same. Alternatively, and as is often the case, a smaller buffer might be used for the VOD content. In that case, as long as the same assumption is used (buffer 90% full), the estimated peak bit rate for the VOD content would be less than that of the live content. In either case, VOD content could be inserted into live content having the same target bit rate without having to perform the content stitching logic check described above with reference to FIG. 3. For example, in the case of HLS content, because the live and VOD peak bit rate estimates are calculated the same way, as long as the target bit rates of the live and VOD content match, it can also be assumed that $BANDWIDTH_{VOD} \times 1.1 \leq BANDWIDTH_{Live} \times 1.25$.

In many cases, live content is converted or transcoded for later distribution as VOD content. However, despite being labeled as VOD content, such converted content is originally (or at least previously) encoded as live content, and so its associated bandwidth tag most likely reflects the constraints of its previous encoding. This results in a situation in which the media player on a client device will make decisions based on the content being labeled as VOD content, but in a way that underestimates the peak bit rate constraint represented by the bandwidth tag value. In the example of HLS live content, the original playlist includes a BANDWIDTH tag value that may be set as much as 25% below the estimated peak bit rate. But once the content becomes a VOD asset, such a value for BANDWIDTH allows for a peak bit rate that violates the constraint that the actual peak bit rate of the VOD variant with which the tag is associated must be within 10% of the BANDWIDTH tag value. One approach is to scan through the content fragments to empirically determine the actual peak bit rate, and set the value for BANDWIDTH based on that.

According to an alternate approach, when live content is converted or transcoded to VOD content, the bandwidth tag value associated with the live content is scaled up to a new value for the VOD content. In the case of HLS content, the scale factor is 1.25/1.1 to reflect the different constraints imposed by the HLS Authoring Spec as described above. In this way, the different constraints for live and VOD content may be harmonized to facilitate the conversion from one type of content to the other.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
  receiving first manifest data including a first variant of a first content stream, the first manifest data specifying a first value for a bandwidth tag, and the first value corresponding to a peak bit rate for the first variant of the live content stream;

receiving second manifest data including a first variant of a second content stream, the second manifest data specifying a second value for the bandwidth tag, and the second value corresponding to a peak bit rate for the first variant of the second content stream;

determining that the second value for the bandwidth tag multiplied by 1.1 is less than or equal to the first value for the bandwidth tag multiplied by 1.25; and generating third manifest data for a first variant of a stitched content stream that includes fragments associated with the first variant of the first content stream and the first variant of the second content stream.

2. The method of claim 1, further comprising determining the first value for the bandwidth tag based on an estimate of the peak bit rate for the first variant of the first content stream, the estimate being determined based on encoder settings for an encoder corresponding to the first variant of the first content stream.

3. The method of claim 2, further comprising calculating the estimate of the peak bit rate for the first variant of the first content stream based on the target bit rate for the encoder and a size of a buffer used by the encoder.

4. The method of claim 1, wherein variants of the first content stream and the second content stream are encoded using one of the following codecs: H.264, H.265, H.266, AV1, VP8, or VP9.

5. The method of claim 1, further comprising:

receiving fourth manifest data including first and second variants of a third content stream, the fourth manifest data specifying third and fourth values for the bandwidth tag, the third and fourth values being associated with the first and second variants of the third content stream, respectively;

determining that the third value for the bandwidth tag multiplied by 1.1 is greater than the first value for the bandwidth tag multiplied by 1.25;

responsive to determining that the third value for the bandwidth tag multiplied by 1.1 is greater than the first value for the bandwidth tag multiplied by 1.25, selecting the second variant of the third content stream;

determining that the fourth value for the bandwidth tag multiplied by 1.1 is less than the first value for the bandwidth tag multiplied by 1.25; and generating fifth manifest data for the first variant of the stitched content stream that includes fragments associated with the first variant of the first content stream and the second variant of the third content stream.

6. A computer program product, comprising one or more non-transitory computer-readable media having computer program instructions stored therein, the computer program instructions being configured such that, when executed by one or more computing devices, the computer program instructions cause the one or more computing devices to:

receive a first playlist including a first variant of a primary content stream, the first playlist specifying a first value for a bandwidth tag, and the first value corresponding to a peak bit rate for the first variant of the primary content stream;

receive a second playlist including first and second variants of an ad content stream, the second playlist specifying second and third values for the bandwidth tag, the second value corresponding to a peak bit rate for the first variant of the ad content stream, and the third value corresponding to a peak bit rate for the second variant of the ad content stream;

select the first variant of the ad content stream for stitching with the first variant of the primary content stream;

determine that the second value for the bandwidth tag multiplied by 1.1 is greater than the first value for the bandwidth tag multiplied by 1.25;

responsive to determining that the second value for the bandwidth tag multiplied by 1.1 is greater than the first value for the bandwidth tag multiplied by 1.25, select the second variant of the ad content stream for stitching with the first variant of the primary content stream;

determine that the third value for the bandwidth tag multiplied by 1.1 is less than or equal to the first value for the bandwidth tag multiplied by 1.25; and responsive to determining that the third value for the bandwidth tag multiplied by 1.1 is less than or equal to the first value for the bandwidth tag multiplied by 1.25, generate a third playlist for a first variant of a stitched content stream that includes fragments associated with the first variant of the primary content stream and the second variant of the ad content stream.

7. The computer program product of claim 6, wherein the computer program instructions are further configured to cause the one or more computing devices to:

generate a fourth playlist that includes fragments associated with the first variant of the primary content stream but no fragments of any variant of the ad content stream.

8. The computer program product of claim 6, wherein the computer program instructions are further configured to cause the one or more computing devices to:

provide the third playlist to a first client device;

receive a request for a fragment associated with the first variant of the stitched content stream from the first client device generated using the third playlist; and transmit the fragment associated with the first variant of the stitched content stream to the first client device.

9. The computer program product of claim 8, wherein the computer program instructions are further configured to cause the one or more computing devices to:

generate a fourth playlist that includes fragments associated with the first variant of the primary content stream but no fragments of any variant of the ad content stream;

provide the fourth playlist to a second client device;

receive a request for a fragment associated with the first variant of the primary content stream from the second client device generated using the fourth playlist; and transmit the fragment associated with the first variant of the primary content stream to the second client device.

10. The computer program product of claim 6, wherein the primary content stream comprises a livestream, and wherein the computer program instructions are further configured to cause the one or more computing devices to:

convert a plurality of variants of the primary content stream including the first variant of the primary content stream to corresponding variants of a video-on-demand (VOD) content stream; and generate a fourth playlist that includes a first variant of the VOD content stream that corresponds to the first variant of the primary content stream, the fourth playlist specifying a fourth value for the bandwidth tag, the fourth value being associated with the first variant of the VOD content stream, and the fourth value being the first value scaled by a factor of 1.25/1.1.

11. A system, comprising one or more computing devices configured to:

receive first manifest data including a first variant of a primary content stream, the first manifest data specifying a first value for a bandwidth tag, and the first value corresponding to a peak bit rate for the first variant of the primary content stream;

receive second manifest data including a first variant of a first ad content stream, the second manifest data specifying a second value for the bandwidth tag, and the second value corresponding to a peak bit rate for the first variant of the first ad content stream;

determine that the second value for the bandwidth tag multiplied by 1.1 is less than or equal to the first value for the bandwidth tag multiplied by 1.25; and generate third manifest data for a first variant of a stitched content stream that includes fragments associated with the first variant of the primary content stream and the first variant of the first ad content stream.

12. The system of claim 11, wherein the one or more computing devices are further configured to determine the first value for the bandwidth tag based on an estimate of the peak bit rate for the first variant of the primary content stream, the estimate being determined based on encoder settings for an encoder corresponding to the first variant of the primary content stream.

13. The system of claim 12, wherein the one or more computing devices are further configured to calculate the estimate of the peak bit rate for the first variant of the primary content stream based on the target bit rate for the encoder and a size of a buffer used by the encoder.

14. The system of claim 11, wherein variants of the primary content stream and the ad content stream are encoded using one of the following codecs: H.264, H.265, H.266, AV1, VP8, or VP9.

15. The system of claim 11, wherein the one or more computing devices are further configured to:

receive fourth manifest data including first and second variants of a second ad content stream, the second manifest data specifying third and fourth values for the bandwidth tag, the third and fourth values being associated with the first and second variants of the second ad content stream, respectively;

determine that the third value for the bandwidth tag multiplied by 1.1 is greater than the first value multiplied by 1.25;

responsive to determining that the third value for the bandwidth tag multiplied by 1.1 is greater than the first value multiplied by 1.25, select the second variant of the second ad content stream;

determine that the fourth value for the bandwidth tag multiplied by 1.1 is greater than or equal to the first value multiplied by 1.25; and generate fifth manifest data for the first variant of the stitched content stream that includes fragments associated with the first variant of the primary content stream and the second variant of the second ad content stream.

* * * * *